United States Patent
Stolzenberg et al.

(10) Patent No.: US 11,645,823 B2
(45) Date of Patent: May 9, 2023

(54) NEUTRAL AVATARS

(71) Applicant: Magic Leap, Inc., Plantation, FL (US)

(72) Inventors: Karen Stolzenberg, Venice, CA (US); Lorena Pazmino, Wilton Manors, FL (US); Savannah Niles, Fort Lauderdale, FL (US); Ian Mankowski, Marina Del Rey, CA (US); Paul Kim, Los Angeles, CA (US); Christina Lee, Los Angeles, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/827,442

(22) Filed: May 27, 2022

(65) Prior Publication Data

US 2022/0405995 A1 Dec. 22, 2022

Related U.S. Application Data

(63) Continuation of application No. 17/157,132, filed on Jan. 25, 2021, now Pat. No. 11,380,072.

(60) Provisional application No. 62/966,278, filed on Jan. 27, 2020.

(51) Int. Cl.
| | |
|---|---|
| *G06T 19/00* | (2011.01) |
| *G06F 3/01* | (2006.01) |
| *G06T 13/40* | (2011.01) |
| *G06V 20/20* | (2022.01) |
| *G06V 40/10* | (2022.01) |
| *G06V 40/18* | (2022.01) |

(Continued)

(52) U.S. Cl.
CPC ............ *G06T 19/006* (2013.01); *G06F 3/012* (2013.01); *G06F 3/013* (2013.01); *G06F 3/017* (2013.01); *G06F 3/167* (2013.01); *G06T 13/40* (2013.01); *G06T 19/20* (2013.01); *G06V 20/20* (2022.01); *G06V 40/11* (2022.01); *G06V 40/193* (2022.01); *G06T 2219/024* (2013.01)

(58) Field of Classification Search
CPC .................................................. G06T 19/006
See application file for complete search history.

(56) References Cited

U.S. PATENT DOCUMENTS

| | | |
|---|---|---|
| 6,802,495 B1 | 10/2004 | Schmidt |
| D499,956 S | 12/2004 | Wall |
| 6,850,221 B1 | 2/2005 | Tickle |
| (Continued) | | |

FOREIGN PATENT DOCUMENTS

WO WO 2021/154646 8/2021

OTHER PUBLICATIONS

International Search Report and Written Opinion for PCT Application No. PCT/US2021/014917, dated Apr. 23, 2021.

(Continued)

*Primary Examiner* — Shivang I Patel
(74) *Attorney, Agent, or Firm* — Klintworth & Rozenblat IP LLP

(57) ABSTRACT

Neutral avatars are neutral with reference physical characteristics of the corresponding user, such as weight, ethnicity, gender, or even identity. Thus, neutral avatars may be desirable to use in various copresence environments where the user desires to maintain privacy with reference to the above-noted characteristics. Neutral avatars may be configured to convey, in real-time, actions and behaviors of the corresponding user without using literal forms of the user's actions and behaviors.

7 Claims, 13 Drawing Sheets

(51) Int. Cl.
*G06F 3/16* (2006.01)
*G06T 19/20* (2011.01)

(56) References Cited

U.S. PATENT DOCUMENTS

| | | |
|---|---|---|
| D519,122 S | 4/2006 | MacKenzie et al. |
| D542,302 S | 5/2007 | Muranaka et al. |
| D546,171 S | 7/2007 | Tabert |
| D561,197 S | 2/2008 | Okaro et al. |
| D563,992 S | 3/2008 | Lettau et al. |
| D593,129 S | 5/2009 | Danton |
| D599,646 S | 9/2009 | Meyers |
| D633,524 S | 3/2011 | Trabona et al. |
| D650,806 S | 12/2011 | Impas et al. |
| D704,734 S | 5/2014 | Wafapoor |
| D717,339 S | 11/2014 | Wen et al. |
| D731,552 S | 6/2015 | Seo et al. |
| D737,331 S | 8/2015 | Paolantonio et al. |
| D738,401 S | 9/2015 | Capela et al. |
| D757,116 S | 5/2016 | Capela et al. |
| D758,448 S | 6/2016 | Kim |
| D761,320 S | 7/2016 | Kim et al. |
| D762,673 S | 8/2016 | Seo et al. |
| D763,309 S | 8/2016 | Seo et al. |
| D764,521 S | 8/2016 | Murillo et al. |
| D765,733 S | 9/2016 | Gagnier |
| D768,206 S | 10/2016 | Fox |
| D801,382 S | 10/2017 | Seo et al. |
| D806,118 S | 12/2017 | Durrant et al. |
| D808,427 S | 1/2018 | Fox |
| D809,014 S | 1/2018 | Henderson et al. |
| D873,285 S | 1/2020 | Pazmino et al. |
| D873,852 S | 1/2020 | Pazmino et al. |
| D877,194 S | 3/2020 | Pazmino et al. |
| D884,737 S | 5/2020 | Tran et al. |
| D885,235 S | 5/2020 | Gurung |
| D893,544 S | 8/2020 | Pazmino et al. |
| D894,226 S | 8/2020 | Paul et al. |
| D936,704 S | 11/2021 | Pazmino et al. |
| D948,562 S | 4/2022 | Pazmino et al. |
| D948,574 S | 4/2022 | Pazmino et al. |
| D949,200 S | 4/2022 | Pazmino et al. |
| 11,380,072 B2 | 7/2022 | Stolzenberg et al. |
| 2001/0048447 A1 | 12/2001 | Jogo |
| 2002/0067362 A1 | 6/2002 | Agostino Nocera et al. |
| 2006/0023923 A1 | 2/2006 | Geng et al. |
| 2006/0028436 A1 | 2/2006 | Armstrong |
| 2007/0081123 A1 | 4/2007 | Lewis |
| 2012/0062688 A1 | 3/2012 | Shen et al. |
| 2012/0110052 A1 | 5/2012 | Smarr et al. |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0047361 A1 | 2/2014 | Gaspar et al. |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0286858 A1 | 10/2015 | Shaburov et al. |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0270656 A1 | 9/2016 | Samec et al. |
| 2018/0091732 A1 | 3/2018 | Wilson et al. |
| 2018/0253895 A1* | 9/2018 | Arumugam .......... G06V 20/647 |
| 2019/0114038 A1* | 4/2019 | Geiger .................. G06T 11/60 |
| 2021/0233318 A1 | 7/2021 | Stolzenberg |

OTHER PUBLICATIONS

ARToolKit: https://web.archive.org/web/20051013062315/http://www.hitl.washington.edu:80/artoolkit/documentation/hardware.htm, archived Oct. 13, 2005.
Avatar Icon Ninja, https://www.iconninja.com/avatar-anonym-person-user-default-unknown-head-icon-15892. (Year: 2016).
Magic Leap Launches Avatar Chat, https://nwn.blogs.com/nwn/2018/11/avatar-chat-magic-leap-augmented-reality.html (Year: 2018).
Magic Leap to Release Avatar Chat AR Social App This December—Jagneaux, https://uploadvr.com/magic-leap-to-release-avatar-chat-ar-social-app-this-december. (Year: 2018).
Set Robot avatar—Sined, https://depositphotos.com/300128838/stock-illustration-set-robot-head-avatar-emotions.html. (Year: 2019).
Profile avatar—Wikimedia Commons, https://commons.wikimedia.org/wiki/File:Profile_avatar_placeholder_large.png (Year: 2015).
3D Shapes—Shkitenkov, https://dribble.com/shots/2480253-3d-Shapes (Year: 2016).
Account avatar—Avery, https://www.iconfinder.com/icons/4113394/account_avatar_figure_human_person_profile_user_icon. (Year: 2019).
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC—Chapel Hill, NC, Feb. 1995.
Bimber, et al., "Spatial Augmented Reality ~ Merging Real and Virtual Worlds," 2005 https://web.media.mit.edu/~raskar/book/BimberRaskarAugmentedRealityBook.pdf.
Guegan, et al., "Avatar-mediated creativity: When embodying inventors makes engineers more creative," Computers in Human Behavior 61 (2016): 165-175, Mar. 8, 2016.
Iconfinder "Account, avatar, figure, human, person, profile, user icon," https://www.iconfinder.com/icons/4113394/account_avatar_figure_human_person_profile_user_icon, in 2 pages, 2019.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Jo et al., "The impact of avatar-owner visual similarity on body ownership in immersive virtual reality," Proceedings of the 23rd ACM Symposium on Virtual Realty Software and Technology. Nov. 2017.
Michelle, "Design Better Avatars," UX Collective, May 2, 2017. <https://uxdesign.cc/design-avatars-that-make-sense-and-be-more-inclusive-in-the-process~d4dd6a486ea6>.
Shkitenkov, "3D Shapes," https://dribbte.com/shots/2480253-3d-Shapes, in 2 pages, 2016.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Wikimedia Commons, "File: Profile avatar placeholder large.png," https://commons.wikimedia.org/wiki/File:Profile_avatar_placeholder_large.png (2015), in 2 pages.
Yoon, et al., "The effect of avatar appearance on social presence in an augmented reality remote collaboration," 2019 IEEE Conference on Virtual Reality and 3D User Interfaces (VR), Mar. 27, 2019.

* cited by examiner

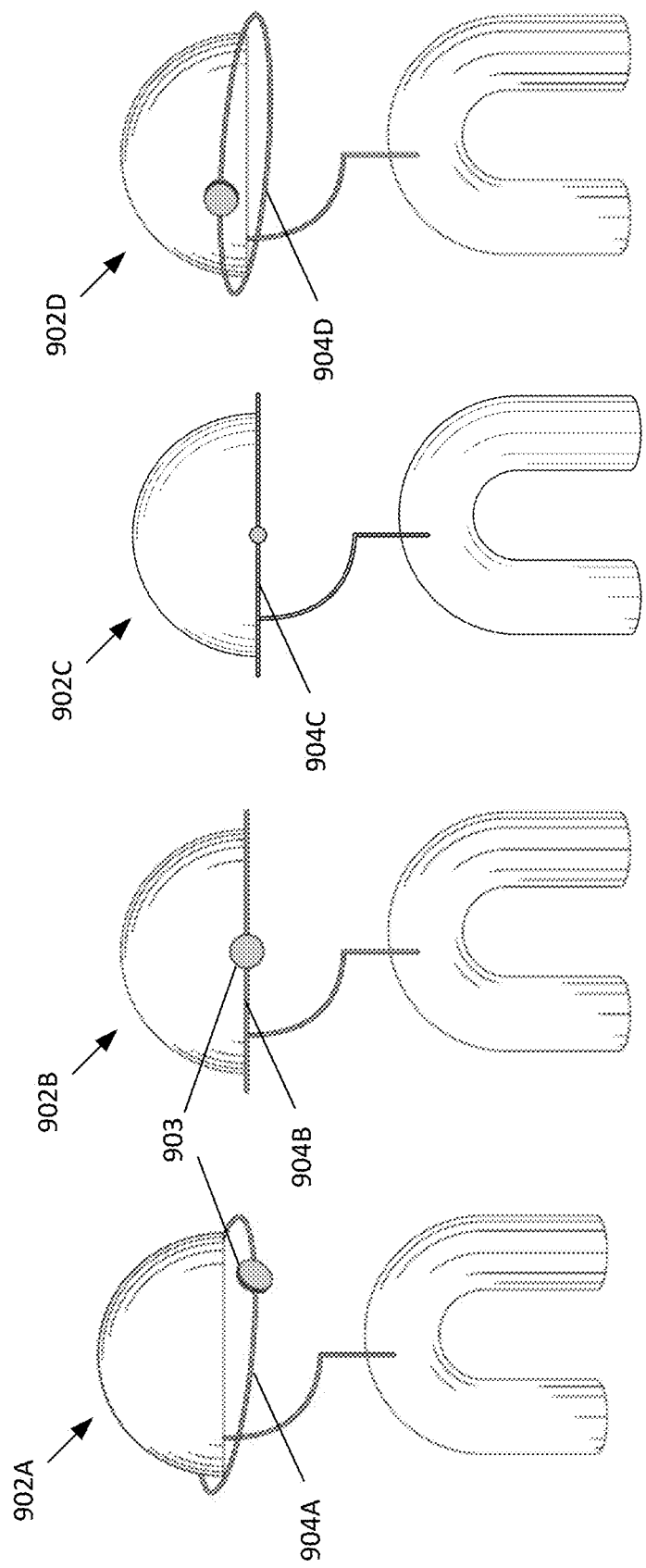

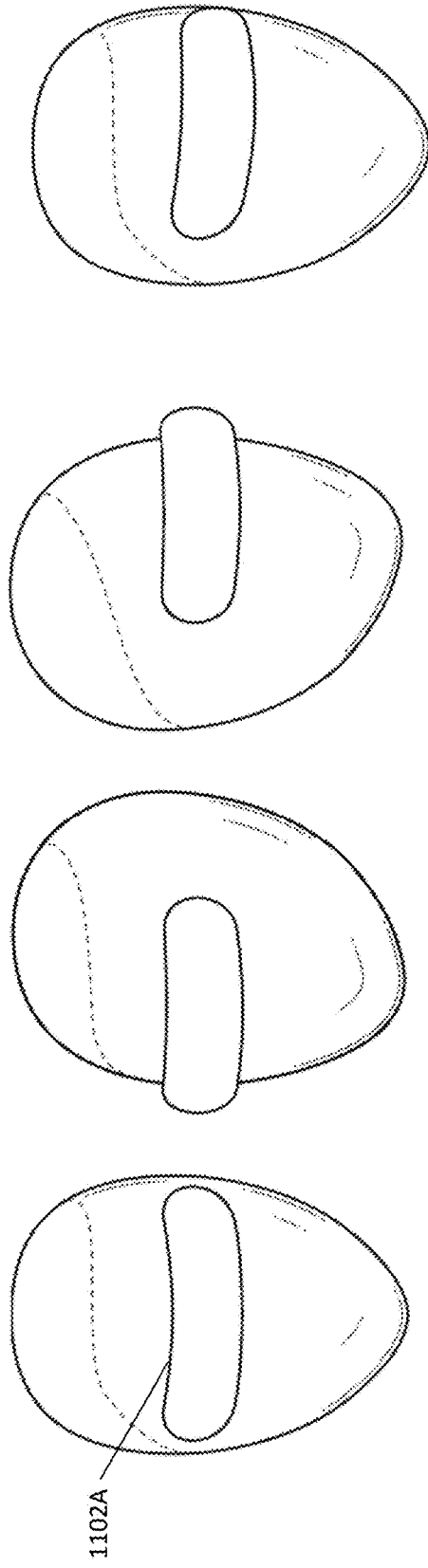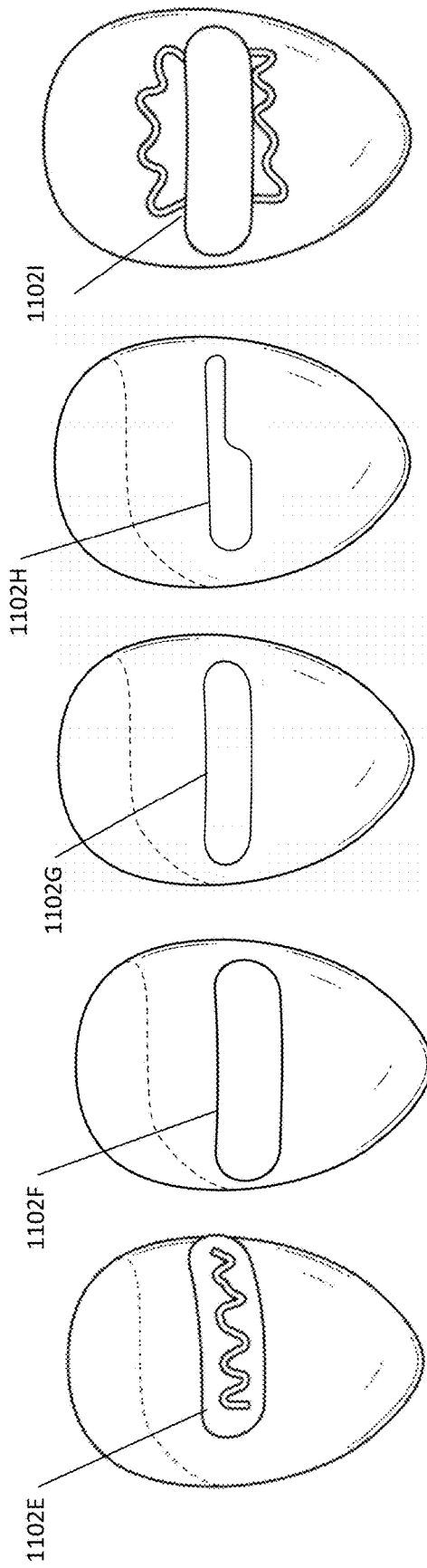

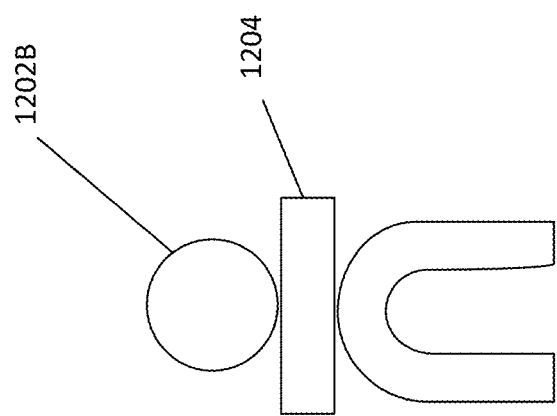
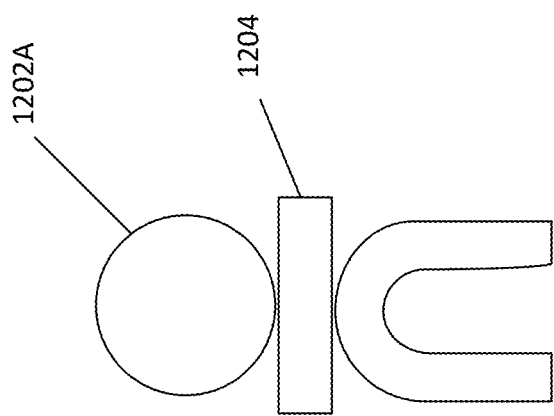

NEUTRAL AVATARS

PRIORITY CLAIM

This application is a continuation of U.S. application Ser. No. 17/157,132, filed on Jan. 25, 2021, entitled "NEUTRAL AVATARS," which claims the benefit of priority of U.S. Provisional Application No. 62/966,278, filed Jan. 27, 2020, entitled "NEUTRAL AVATARS," which is incorporated herein by reference.

FIELD

The present disclosure relates to virtual reality and augmented reality, including mixed reality, imaging and visualization systems and more particularly to animating virtual characters, such as avatars.

BACKGROUND

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

SUMMARY

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Embodiments of the present disclosure are directed to devices, systems, and methods for facilitating virtual or augmented reality interaction. As one example embodiment, one or more user input devices may be used to interact in a VR, AR or MR session. Such sessions may include virtual elements or objects in a three-dimensional space. The one or more user input devices may further be used for pointing, selecting, annotating, and drawing, among other actions on virtual objects, real objects or empty space in an AR or MR session. For ease of reading and understanding, certain systems and methods discussed herein refer to an augmented reality environment or other "augmented reality" or "AR" components. These descriptions of augmented reality" or "AR" should be construed to include "mixed reality," "virtual reality," "VR," "MR," and the like, as if each of those "reality environments" were specifically mentioned also.

As disclosed herein, "neutral avatars" are avatars that are neutral in the characteristics listed above, as well as other characteristics that may be determined based on combinations of physical characteristics of avatars, such as ethnicity, gender, or even identity of the user. Thus, these neutral avatars may be desirable to use in various copresence environments where the user desires to maintain privacy with reference to the above-noted characteristics. Neutral avatars may be configured to convey, in real-time, actions and behaviors of the corresponding user without using literal forms of the user's actions and behaviors.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

FIGS. 9A, 9B, 9C, and 9D illustrate another example neutral avatar, wherein a visual feature includes portions (e.g., a ring and a circle) that are separately responsive to different input signals.

FIGS. 11A-11I illustrate another example neutral avatar with various forms of a visual feature that may be dynamically updated based on one or more input signals.

FIG. 12A-12B illustrates another example neutral avatar, wherein a morph, movement, and/or other visual change to portions of the neutral avatar may be mapped to one or more input signals.

Figure 1:
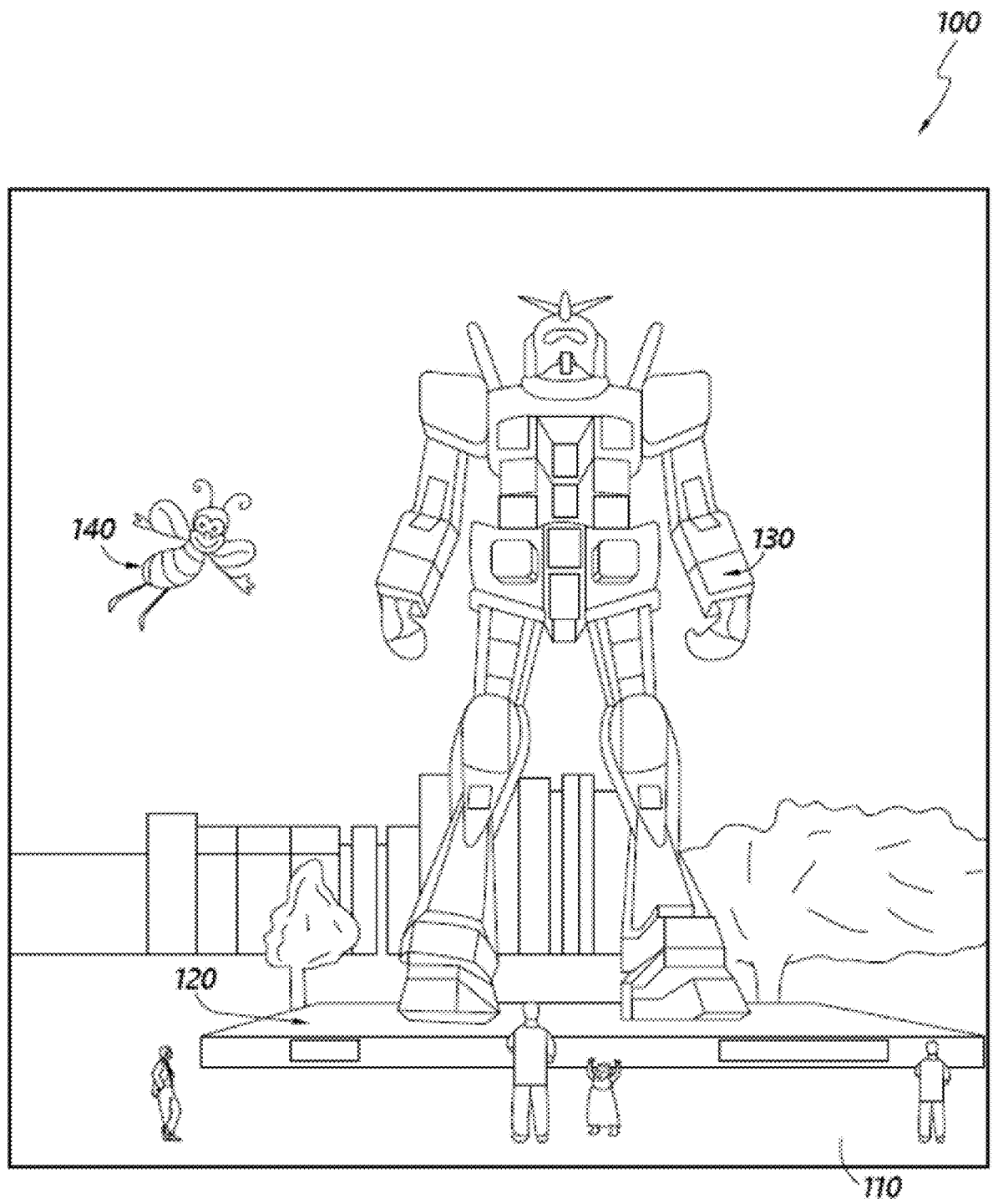
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A virtual avatar may be a virtual representation of a real or fictional person in an AR environment. For example, during a telepresence session in which two or more AR users are interacting with each other, a viewer can perceive an avatar of another user in the viewer's environment and thereby create a tangible sense of the other user's presence in the viewer's environment. The avatar can also provide a way for users to interact with each other and do things together in a shared virtual environment. For example, a student attending an online class can perceive and interact with avatars of other students or the teacher in a virtual classroom. As another example, a user playing a game in an AR environment may view and interact with avatars of other players in the game.

Avatars may be modeled after the look and persona of the human user, such as to mirror movements of the user's body, head, eyes, lips, etc., in making the avatars movements as lifelike as possible. Thus, these "literal avatars" may convey characteristics, such as body type, gender, height, weight, hair color, hair length, hair style, eye color, skin tone, etc., to other users. Additionally, such literal avatars may directly map user actions with avatar animations or sounds. For example, when the user speaks the avatar may move its mouth. While in some cases avatars that are representative of a user's literal looks and actions may be desirable, in other environments avatar neutrality is desired, such as to retain privacy of the user regarding these literal characteristics.

As disclosed herein, "neutral avatars" are avatars that are neutral in the characteristics listed above, as well as other characteristics that may be determined based on combinations of physical characteristics of avatars, such as ethnicity, gender, or even identity of the user. Thus, these neutral avatars may be desirable to use in various copresence environments where the user desires to maintain privacy with reference to the above-noted characteristics.

In some embodiments, neutral avatars may be configured to convey, in realtime, actions and behaviors of the corresponding user without using literal forms of the user's actions and behaviors. These behaviors may include, for example, eye gaze (e.g., what direction someone is looking at)
voice activity (e.g., who is talking)
head position (e.g., where is that person's attention directed)
hand direction (e.g., what someone is pointing towards, holding or discussing as an activity during the conversation).

Advantageously, neutral avatars may be animated in manners that convey communication, behavioral, and/or social cues to others. For example, actions of the user (e.g., change in gaze direction, head movements, speaking, etc.) may be mapped to visual cues of the neutral avatar that are not literally representative of the user action. Neutral avatars may use geometry, form, and shapes to represent user behavior instead of literal human features. For example, input signals, such as from sensors of an AR device worn by the user, may be mapped to abstracted geometric forms to represent the user's behavior in real time with non-specific body parts. Because of their abstraction and minimalism, these geometric forms avoid implying specific gender, ethnic identities and can be easily shared between different users.

Some additional advantages of neutral avatar use may include:

Easier and quicker set up. For example, rather than a user going through the process of selecting countless characteristics that may be shown in different manners of an avatar, neutral avatars have very limited customization options. In some embodiments, avatars are automatically assigned to users, entirely eliminating the requirement for a user to select custom avatar features.

Reduces computer resources (e.g., processor cycles, storage, etc.) used in avatar rendering. Because of the focus on conveying certain behavioral, social, and communication cues in the same manner for all users, complex avatar graphics specific to a particular user are not necessary.

May more readily be shared among multiple users using a single AR device, since the neutral avatars don't represent specific characteristics (e.g., a specific identity, ethnicity, gender, etc.) of the corresponding user.

Allows users to not disclose personal information via their avatar, such as may be desired for business collaboration, for example.

Allows concealment of visual form of users, while still allowing collaboration and movement in an AR environment. User's don't need to make aesthetic choices for their avatar that might stand out, be distracting, or send an unintended message, such as in an enterprise context.

Represent real time user behaviors and actions.

Examples of 3D Display of an AR Device

An AR device (also referred to herein as an augmented reality (AR) system) can be configured to present 2D or 3D virtual images to a user. The images may be still images, frames of a video, or a video, in combination or the like. At least a portion of the AR device can be implemented on a wearable device that can present a VR, AR, or MR environment, alone or in combination, for user interaction. The wearable device can be used interchangeably as an AR device. Further, for the purpose of the present disclosure, the term "AR" is used interchangeably with the term "MR" and "VR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

For the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

AR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
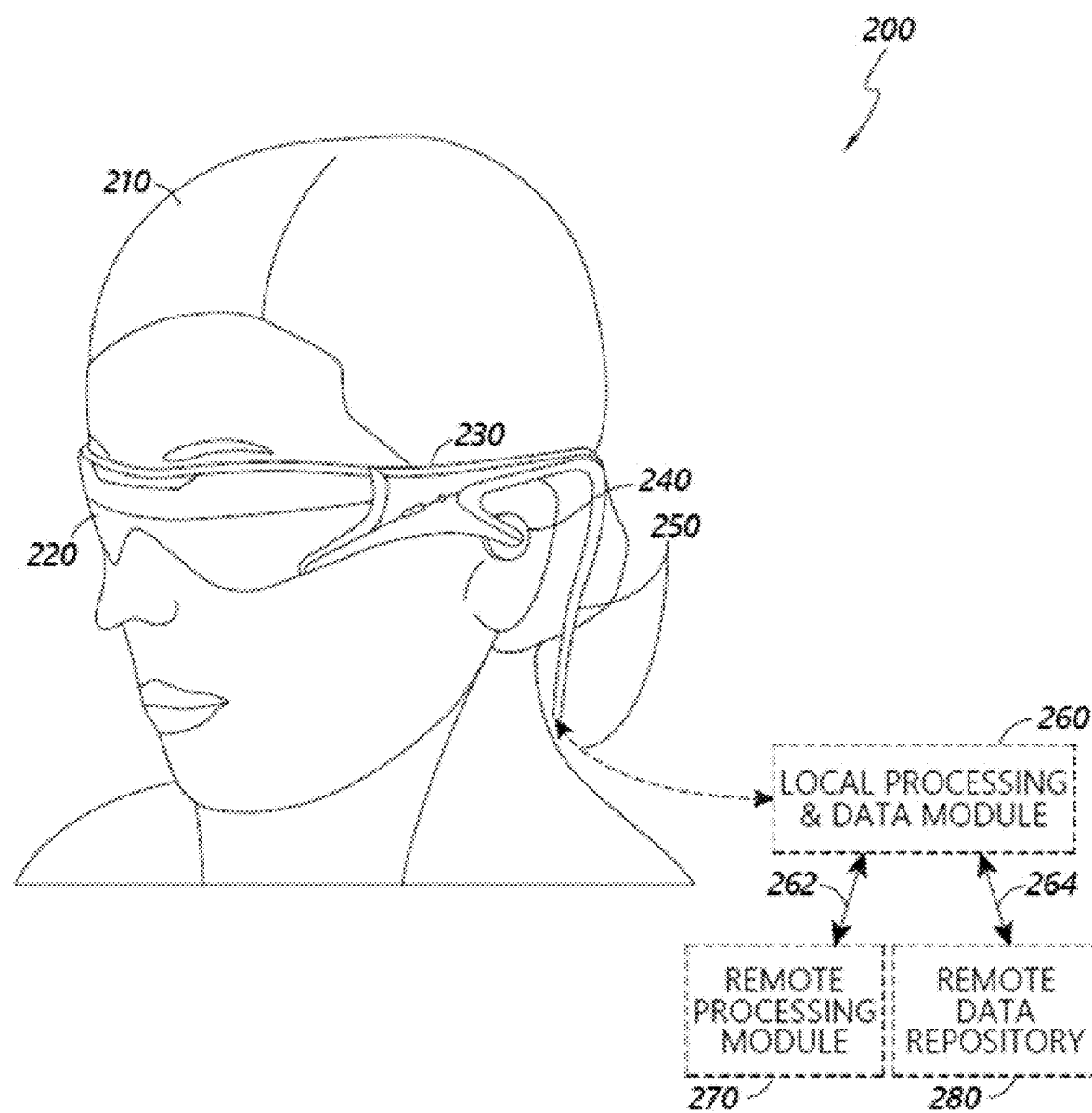
FIG. 2 illustrates an example AR device that can be configured to provide an AR/VR/MR scene.

FIG. 2 illustrates an example AR device 200 which can be configured to provide an AR scene. The AR device 200 can also be referred to as the AR system 200. The AR device 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The AR device 200 can perform voice or speech recognition on the audio stream.

The AR device 200 can include an outward-facing imaging system which observes the world in the environment around the user. The AR device 200 can also include an inward-facing imaging system which can track the eye movements of the user. The inward-facing imaging system may track either one eye's movements or both eyes' movements. The inward-facing imaging system may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the AR device 200 can use the outward-facing imaging system or the inward-facing imaging system to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

Example Components of an AR Device

Figure 3:
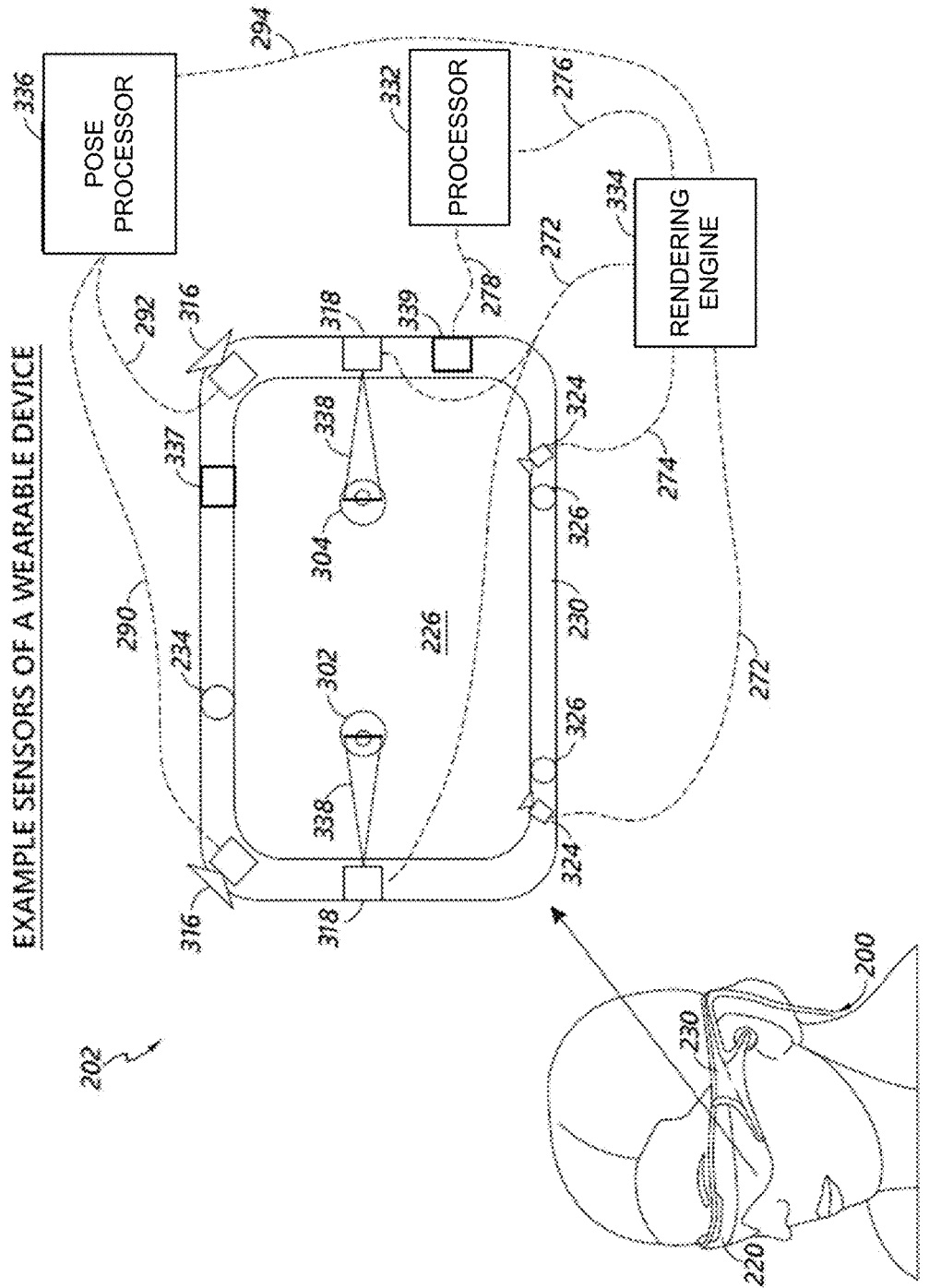
FIG. 3 schematically illustrates example components of an AR device.

FIG. 3 schematically illustrates example components of an AR device. FIG. 3 shows an AR device 200 which can include a display 220 and a frame 230. A blown-up view 202 schematically illustrates various components of the AR device 200. In certain implements, one or more of the components illustrated in FIG. 3 can be part of the display 220. The various components alone or in combination can collect a variety of data (such as e.g., audio or visual data) associated with the user of the AR device 200 or the user's environment. In some embodiments, the AR device 200 may have additional or fewer components depending on the application for which the AR device is used. Nevertheless, FIG. 3 provides a basic idea of some of the various components and types of data that may be collected, analyzed, and stored through the AR device.

In the embodiment of FIG. 3, the display 220 includes a display lens 226 that may be mounted to a user's head or a housing or frame 230. The display lens 226 may comprise one or more transparent mirrors positioned by the housing 230 in front of the user's eyes 302, 304 and may be configured to bounce projected light 338 into the eyes 302, 304 and facilitate beam shaping, while also allowing for transmission of at least some light from the local environment. The wavefront of the projected light beam 338 may be bent or focused to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras 316 may be part of an outward-facing imaging system. Image acquired by the world cameras 316 can be processed by the pose processor 336. For example, the pose processor 336 can implement one or more object recognizers to identify a pose of a user or another person in the user's environment or to identify a physical object in the user's environment.

With continued reference to FIG. 3, a pair of scanned-laser shaped-wavefront (e.g., for depth) light projector modules with display mirrors and optics configured to project light 338 into the eyes 302, 304 are shown. The depicted view also shows two miniature infrared cameras 324 paired with infrared light (such as light emitting diodes "LED"s), which are configured to be able to track the eyes 302, 304 of the user to support rendering and user input. The AR device 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The pose processor 336 may include an ASIC (application specific integrated circuit), FPGA (field programmable gate array), or ARM processor (advanced reduced-instruction-set machine), which may be configured to calculate real or near-real time user head pose from wide field of view image information output from the capture devices 316. In some embodiments, head position information sensed from one or more sensors in a wearable headset (e.g., a 6Dof sensor) are used to determine avatar characteristics and movements. For example, head position of a user may drive avatar head position, provide an inference location for the avatar torso and an inference location for the avatar's locomotion around a space.

The AR device can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

Also shown is a processor 332 configured to execute digital or analog processing to derive pose from the gyro, compass, or accelerometer data from the sensor assembly 339. The processor 332 may be part of the local processing and data module 260 shown in FIG. 2. The AR device 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The AR device may combine data acquired by the GPS 337 and a remote computing system (such as, e.g., the remote processing module 270, another user's AR device, etc.) which can provide more information about the user's environment. As one example, the AR device can determine the user's location based on GPS data and retrieve a world map (e.g., by communicating with a remote processing module 270) including virtual objects associated with the user's location. As another example, the AR device 200 can monitor the environment using the world cameras 316. Based on the images acquired by the world cameras 316, the AR device 200 can detect objects in the environment (e.g., by using one or more object recognizers).

The AR device 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the AR device 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a beltpack and configured to communicate with other components of the AR device via wireless communication, such as ultra-wideband, Wi-Fi, Bluetooth, etc., or via wired communication. The depicted housing 230 preferably is head-mountable and wearable by the user. However, some components of the AR device 200 may be worn to other portions of the user's body. For example, the speaker 240 may be inserted into the ears of a user to provide sound to the user.

Regarding the projection of light 338 into the eyes 302, 304 of the user, in some embodiment, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, titled "Methods and systems for diagnosing and treating health ailments," filed on Mar. 16, 2016, which is hereby incorporated by reference in its entirety and for all purposes.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the AR device 200 is configured to display one or more virtual images based on the accommodation of the user's eyes. Unlike prior 3D display approaches that force the user to focus where the images are being projected, in some embodiments, the AR device is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the AR device 200 of some embodiments allows the user's eye to a function in a more natural manner.

Such an AR device 200 may eliminate or reduce the incidences of eye strain, headaches, and other physiological symptoms typically observed with respect to virtual reality devices. To achieve this, various embodiments of the AR device 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, AR device 200 may employ eye tracking to determine a vergence of the user's eyes, determine the user's current focus, and project the virtual image at the determined focus. In other embodiments, AR device 200 comprises a light modulator that variably projects, through a fiber scanner, or other light generating source, light beams of varying focus in a raster pattern across the retina. Thus, the ability of the display of the AR device 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Examples of Avatar Rendering in Mixed Reality

An AR device may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the AR device can be added to a world model by including new pictures that convey information about various points and features of the real world. For example, the AR device can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 4:
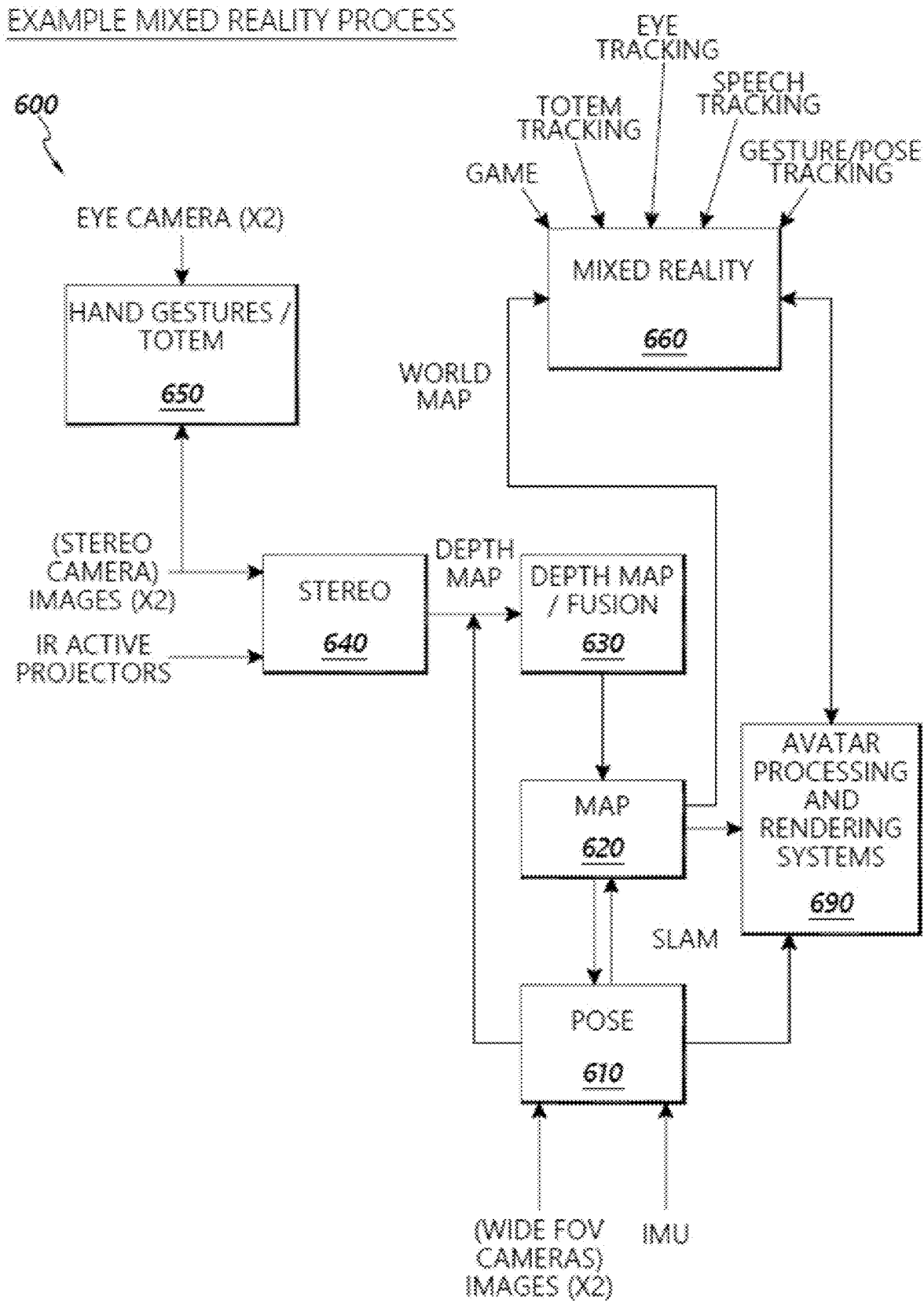
FIG. 4 is a block diagram of another example of an AR device which can comprise an avatar processing and rendering system in a mixed reality environment.

FIG. 4 is a block diagram of another example of an AR device which can comprise an avatar processing and rendering system 690 in an augmented reality environment. In this example, the AR device 600 can comprise a map 620, which may include at least a portion of the data in a map database. The map may partly reside locally on the AR device, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the embodiment depicted in FIG. 4, game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the AR device 600. As described herein, user inputs can include visual input, gestures, totems, audio input, sensory input, etc. In order to move around or play a game, for example, the user may need to instruct the AR device 600 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The AR device 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The AR device 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input that can be used alone or in combination with other inputs (e.g., totem tracking, eye tracking, gesture tracking, etc.). Speech tracking may include speech recognition, voice recognition, alone or in combination. The AR device 600 can include an audio sensor (e.g., a microphone) that receives an audio stream from the environment. The AR device 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms, or other algorithms that uses acoustic modeling or language modeling, etc.

The local data & processing module 260 or the remote processing module 270 can also apply voice recognition algorithms which can identify the identity of the speaker, such as whether the speaker is the user 210 of the AR device 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms to perform the voice recognition.

An implementation of an AR device can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example AR device 600 shown can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system. The AR device 600 can include eye tracking cameras oriented toward the eyes of the user in order to triangulate eye vectors and other information. The AR device 600 may also comprise one or more textured light projectors (such as infrared (IR) projectors) to inject texture into a scene.

The AR device 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 260 or the remote processing module 262, 264 alone or in combination. In various embodiments, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network.

Figure 5A:
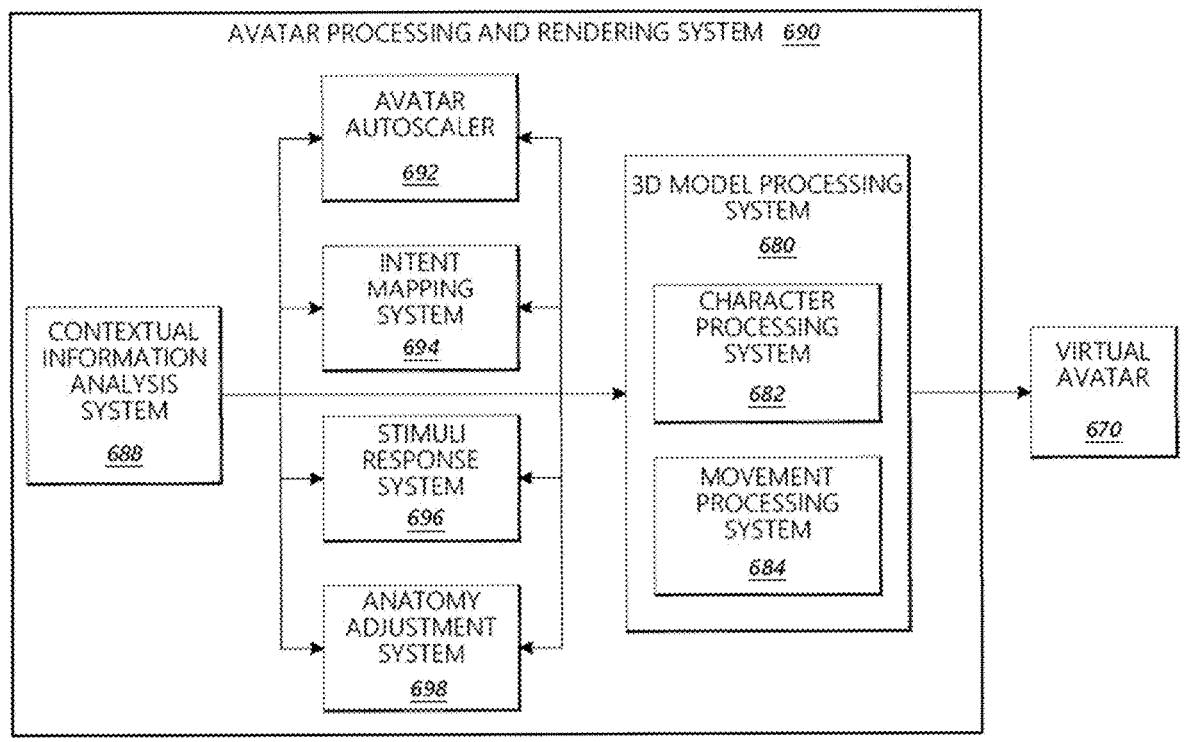
FIG. 5A illustrates an example avatar processing and rendering system.

FIG. 5A illustrates an example avatar processing and rendering system 690. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images acquired by the outward-facing imaging system of the user or the viewer of the user's avatar. The contextual information analysis system 688 can analyze such images alone or in combination with a data acquired from location data or world maps to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the user's avatar such that a portion of the user's avatar's body (e.g., the head) is not at an uncomfortable (or unrealistic) position with respect to the other portions of the user's body (e.g., the avatar's head is not turned 270 degrees). In certain implementations, one or more object recognizers may be implemented as part of the contextual information analysis system 688.

The avatar autoscaler 692, the intent mapping system 694, the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session. Typically, two people face each other when communicating. The intent mapping system 694 of the first user's AR device can determine that such a face-to-face intent exists during the telepresence session and can cause the first user's AR device to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the avatar's pose, by moving the avatar around in a user's environment, or by animating the avatar's facial expressions, etc. As will further be described herein, the virtual avatar can be animated using rigging techniques. In some embodiments, an avatar is represented in two parts: a surface representation (e.g., a deformable mesh) that is used to render the outward appearance of the virtual avatar and a hierarchical set of interconnected joints (e.g., a core skeleton) for animating the mesh. In some implementations, the virtual character processing system 682 can be configured to edit or generate surface representations, while the movement processing system 684 can be used to animate the avatar by moving the avatar, deforming the mesh, etc.

Example Neutral Avatar Mapping System

Figure 5B:
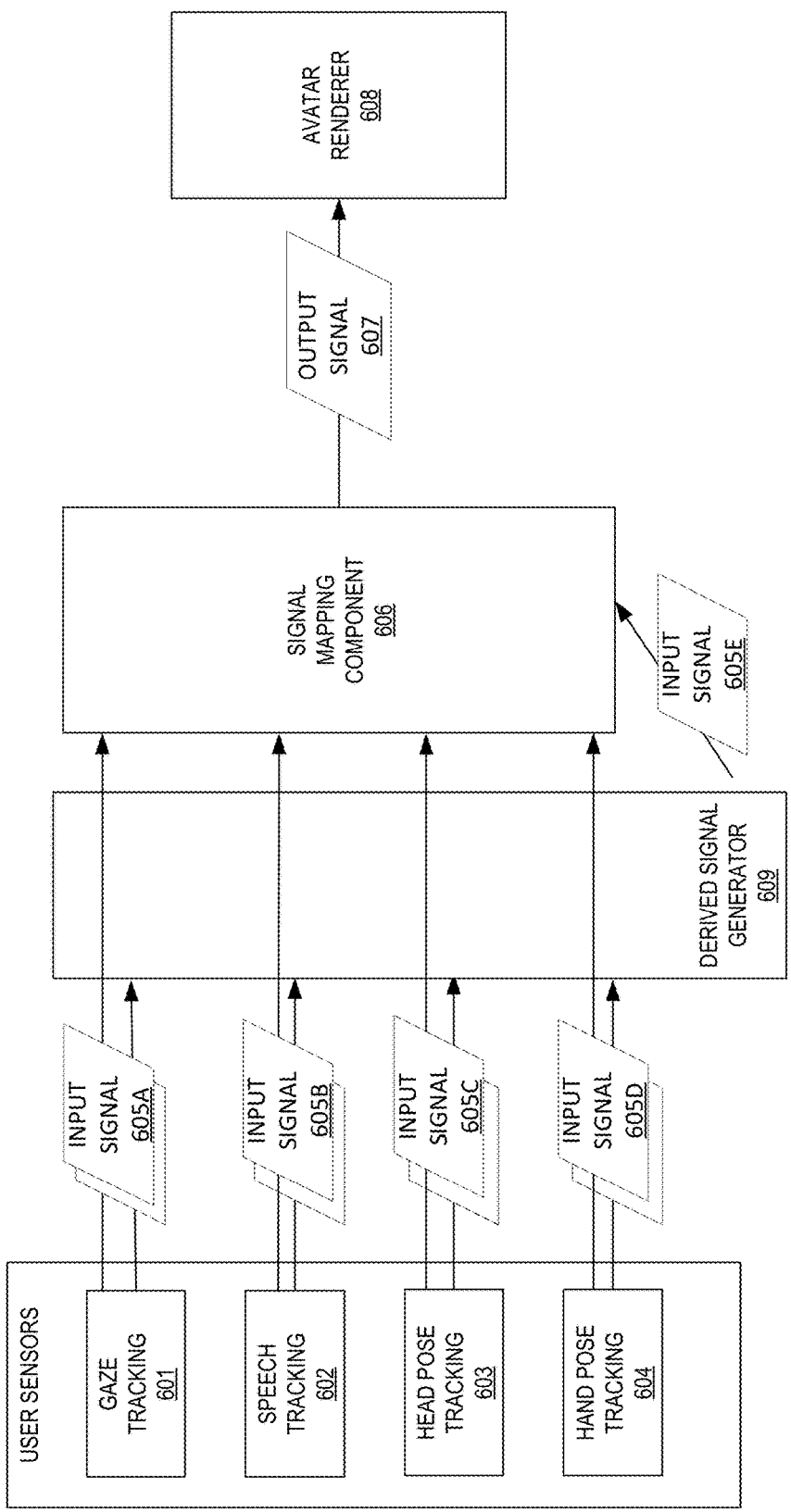
FIG. 5B is a block diagram illustrating an example of components and signals associated with implementation of neutral avatars.

FIG. 5B is a block diagram illustrating an example of components and signals associated with implementation of neutral avatars. In this example, several user sensor components 601-604 provide input signals 605 (including 605A, 605B, 605C, and 605D) to a signal mapping component 606. The signal mapping component 606 is configured to analyze the input signals 605 and determine updates to a neutral avatar that may then be transmitted to an avatar renderer 608 (e.g., part of the avatar processing and rendering system 690 of FIG. 5A) as one or more output signals 607. In the embodiment of FIG. 5B, the user sensors include gaze tracking 601, speech tracking 602, head pose tracking 603, and hand pose tracking 604. Each of these user sensors may include one or multiple sensors, of a same type of multiple different types. The types of input signals 605 may vary from one embodiment to another, such as to include fewer or additional user sensors. In some embodiments, input signals 605 may also be processed (e.g., prior to or concurrent with transmission to the signal mapping component 606), such as to determine additional input signals for use by the signal mapping component. In the example of FIG. 5B, a derived signal generator 609 also receives each of the input signals 605A-605 D and may generate one or more input signals 605E that are transmitted to the signal mapping component 606. The derived signal generator may create the input signal 605E indicative of user intent, behaviors, or actions that are not directly linked to one of the input signals 605A-605D.

The signal mapping component 606 may include a mapping table in various forms. For example, a lookup table that allows one-to-one, one-to-many, and many-to-many mappings between input signals and output signals. Similarly, a rules list, pseudocode, and/or any other logic may be used by the signal mapping component 606 to determine the appropriate output signal 607 that is mapped to the current input signals 605. Advantageously, the signal mapping component 606 operates in real-time to map the input signals 605 to one or more output signals 607 so that updates to the neutral avatar (as implemented by the avatar renderer 608) are applied concurrent with the triggering user activity.

In some embodiments, the signal mapping component is configured to 1) measure a parameter of a user associated with a portion of the user's body and then 2) map the measured parameter to a feature of a neutral avatar, where the feature of the neutral avatar is not representative of the portion of the user's body. The measured parameter may be the input signals 605, and the mapped feature of the neutral avatar may be indicated in the corresponding output signal 607 generating by the signal mapping component 606. As an example of this mapping, rotation of a user's eye may be a parameter of a user, which is associated with the eyes of the user's body. As noted above, this eye rotation by the user may be mapped to a line or other geometric feature that is positioned outside of an eye area of a neutral avatar, and is thus not representative of the eyes of the user. This type of mapping of an input signal associated with one body part to a visual indicator of a neutral avatar of a second body part may be referred to as a non-literal mapping.

In some embodiments, a non-literal mapping may also be to an action of the feature of the neutral avatar (e.g., animation, color, texture, sound, etc.) that is not representative of the action of the user's body from which the parameter was measured. For example, a line feature of a neutral avatar may change color in response to a speech input signal measured from the user. This change in color is not representative of the speech action performed by the user (e.g., opening and closing of the user's mouth) to provide the speech input. Thus, this mapping may also be considered a non-literal mapping.

In some embodiments, input signals associated with a particular body portion and/or activity of the particular body portion of the user may be mapped to disparate, unrelated, unassociated, distinct, and/or different features and/or activities of a neutral avatar. For example, the signal mapping component 606 may map input signals to non-literal output signals associated with a neutral avatar. For example, in response to a user speaking, an input signal 605B may be transmitted to the signal mapping component 606, which may then map the speaking to a color or shading adjustment output signal 607 that is applied to the neutral avatar. Thus, shading of some or all of the neutral avatar may be dynamically adjusted as the voice input is received. The shading may be applied to a portion of the avatar not directly associated with speech, such as a non-mouth area of the face or a geometric feature of the neutral avatar (e.g., not directly associated with a particular facial feature of a user). For example, an upper portion of the neutral avatar may be shaded differently when the user is speaking. The shading may be updated dynamically, such as with adjustments to a level and/or area of shading, as the voice input changes (e.g., the volume, tone, pattern, etc. of the speech). This is in contrast to typical avatar behavior where speaking by the user is indicated in an avatar with movement of the avatar's mouth in a speaking pattern. Thus, the neutral avatars are configured to provide identity neutral visualizations with behavioral, social, and communication cues expressed in manners that are not directly mapped to the corresponding user action.

In another example, rather than mapping an eye gaze input signal (e.g., measured by one or more sensors of an AR device) in a one-to-one or direct manner to control the rotation of an avatar's eye, such as would be done under a literal mapping, an indirect (or non-literal) mapping may map pupil tracking of the user's eyes to changes in shape of a feature of the neutral avatar (e.g., a head, body, or geometric shape of the neutral avatar), shading of a feature (e.g., a portion or all of the neutral avatar head, body, or geometric shape), color of a feature, and/or to any other feature of the avatar that is not the avatar pupil. Thus, eye movements of a user may be mapped to fluctuations in color or shading of a neutral avatar, or even to an ancillary feature of the neutral avatar, such as a background or object near the neutral avatar.

In some embodiments, multiple input signals 605 may be associated with a single visual element of a neutral avatar. For example, eye gaze direction and voice may be mapped to the same visual element of a neutral avatar, such as a horizontal line or other geometric shape. That single visual element may be configured to wiggle to express voice activity and shift (e.g., left-right) or deform to express gaze direction. Thus, multiple user actions may be conveyed in a more precise visual manner, without distractions of highly customized avatar visual characteristics. In some implementations, mapping of multiple input signals to one visual element of a neutral avatar may increase the emergent sense of liveliness and/or the visual complexity of these simple neutral features. Because a real human face is capable of many nuanced movements, a simple visual element responding to a single cue (e.g., a single input signal) may be less believable as representing this complex human behavior, rather than a single visual element that has more complex behavior responding to multiple cues (e.g., multiple input signals). Mapping of multiple input signals to a same visual element of a neutral avatar may provide further visual abstraction, rather than literal visual familiarity.

The visual elements of the neutral avatars are configured to convey human behaviors for communication and collaboration (e.g., in a remote copresence environment).

In some embodiments, head positions of the user (e.g., from the head pose tracking 603) may map to changes (e.g., shading, movement, morph) of larger elements of a neutral avatar. In some embodiments, eye gaze and eye tracking information (e.g., from gaze tracking 601) may be mapped to smaller elements, such as to geometric shapes that move, translate and animate to correspond to eye tracking signals. In some embodiments, voice signals may be mapped to particle shaders or geometric elements that transition, transform, and/or animate according to voice amplitude and/or voice phonemes.

FIGS. 6-12 illustrate several neutral avatar examples, along with example input signals that may be mapped to output signals that trigger updates to the neutral avatars. Beginning with FIG. 6, a neutral avatar is shown in each of FIGS. 6A, 6B, 6C, with different visual features 603 that are indicative of non-literal input signals from one or more user sensors. In some implementations, as the user articulates certain sounds, they are correlated with display and/or characteristics of a particular visual features, such as an opacity of visual features 603, 611, or 612. In the example, the features may become more or less opaque depending on what the user is saying based on, for example, the volume, pitch, tone, speed, pattern, and/or speech that is recognized in the voice input. Thus, visual characteristics of these visual features may be proportionally mapped to an opacity of such visual features. For example, shading or color of the visual feature may increase and decrease dynamically to follow increases and decreases of the corresponding one or more voice features.

Figure 6C:
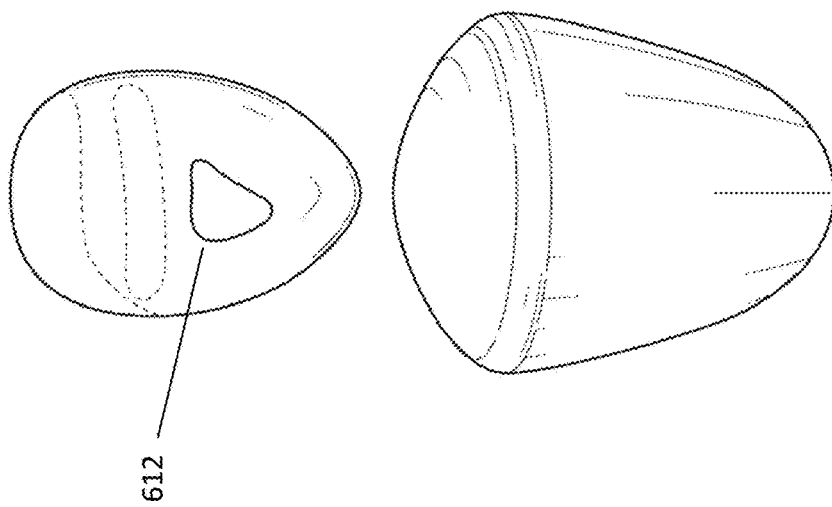
FIGS. 6A, 6B, 6C are illustrates of example neutral avatars, with different visual features that are indicative of non-literal input signals from one or more user sensors.
Figure 6B:
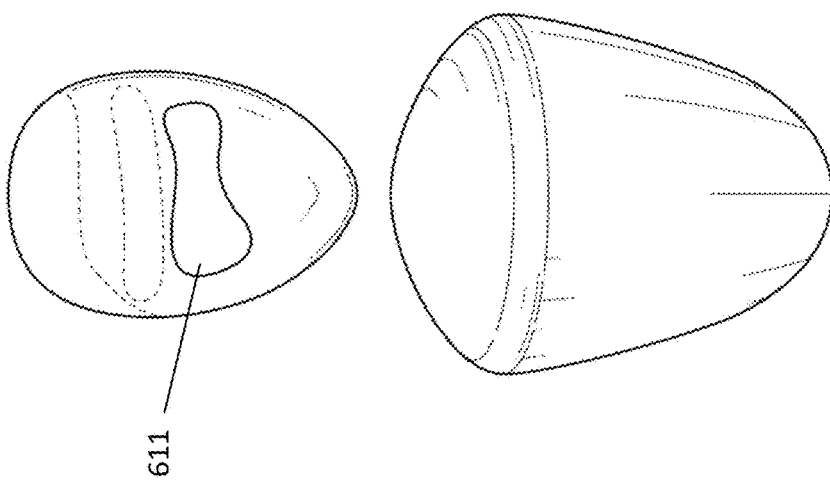
Figure 6A:
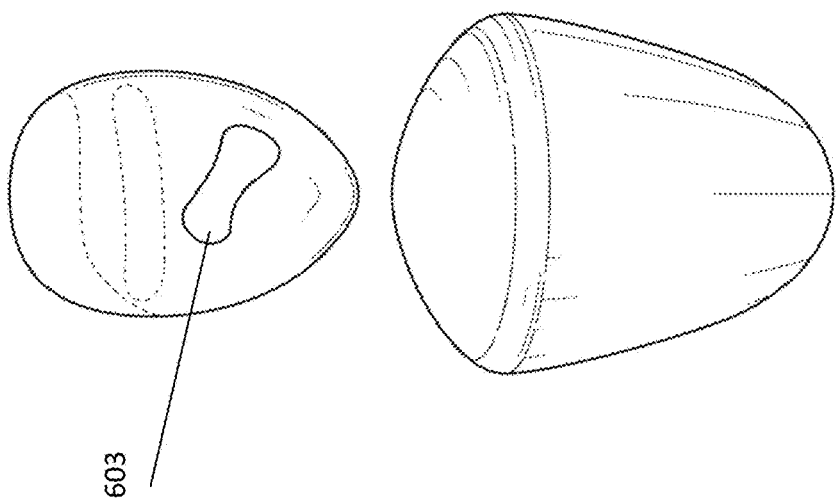

In one embodiment, the visual features 603 of the neutral avatar of FIG. 6A may appear when the user makes an "ah" sound (or another front vowel sound), the visual features 611 of the neutral avatar of FIG. 6B may appear when the user makes an "oo" sound (or another rear vowel sound), and the visual features 612 of the neutral avatar of FIG. 6C may appear when the user making a "th" sound. Thus, the visual features 603, 611, 612 may alternatively be displayed on the neutral avatar as the user makes the different corresponding sounds. In some embodiments, the shape of the user's mouth (e.g., which may be referred to as a viseme) may be mapped to various output signal that may impact the look and/or behavior of a neutral avatar. For example, the relative size of a viseme, e.g., size of opening of the user's mouth, may map to an amplitude or loudness characteristic. This amplitude characteristic may then be used as a driver of some aspect of the neutral avatar, such as the size or shape of a visual indicator of the neutral avatar. Additionally, the color, texture, shading, opacity, etc. of the visual features may be adjusted based on other factors of the voice input and/or other input signals.

In some embodiments, the position and/or translation of a visual indicator of a neutral avatar may map to an eye gaze direction input signal. For example, a visual indicator that is mapped to viseme shape (e.g., that increases/decreases size as an open area of the mouth in the viseme increases/decreases) may be moved based on eye gaze of the user.

In some embodiments, other transformations of a visual indicator, such as squeezes, contractions, etc., could map to eye blink events.

Figures 7A, 7B, 7C:
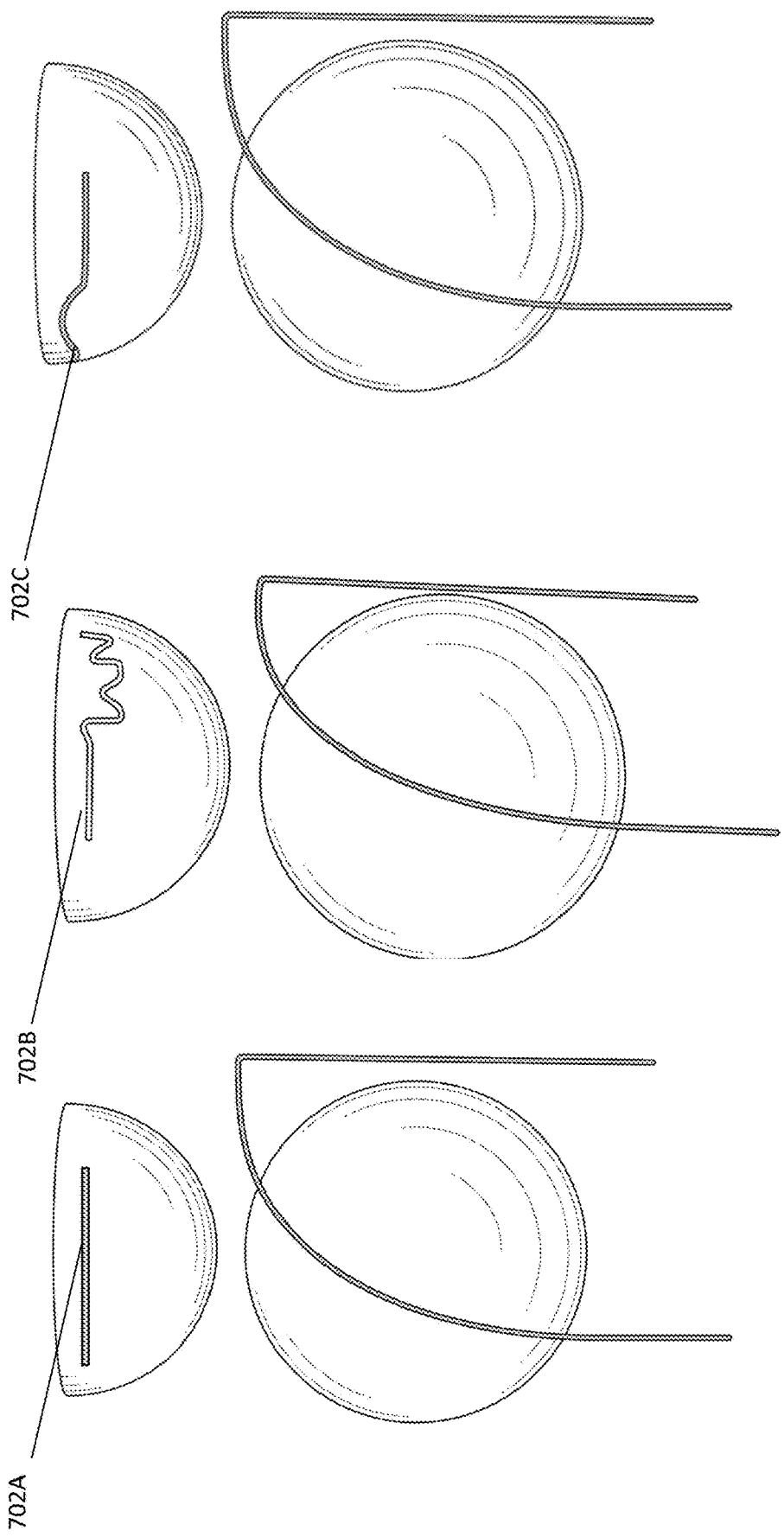
FIGS. 7A, 7B, and 7C illustrate another example neutral avatar, where a visual feature is adjusted based on one or more of various input signals.

FIGS. 7A, 7B, and 7C illustrate another example neutral avatar, where a visual feature 702 is adjusted based on one or more of various input signals. In this example, a deformation in the visual feature 702 may be associated with the user's head pose. For example, an input signal indicating a head pose to the right may result in the deformation of the visual feature 702B while head pose to the left may result in the deformation of visual feature 702C. The direction of the deformation (e.g., upward or downward) may be based on another input signal, such as the user's attentiveness or based on a particular user intent (e.g., that may be determined based on multiple input signals). The single line visual feature 702 may reflect multiple input signals, such as by deforming in a first manner to indicate gaze and in a second manner to indicate voice input.

In one embodiment, the visual feature 702A is indicative of an idle state of the user. In FIG. 7B, the visual feature 702B is deformed in response to an input signal indicating a particular viseme (e.g., "Ahh" sound). The deformation area of visual feature 702B may shift to the left, for example, in response to gaze direction. Thus, visual feature 702C may indicate that gaze direction of the user has shifted to the left, and the updated deformation may be indicative of another viseme, or no voice input.

In some embodiments, transformations (e.g., deformations) of the visual features 702 (or other simple geometric shape) may be mapped to eye gaze shifts, while head pose may be mapped to other visual features, such as rotation of the entire hemisphere shape that includes the visual features 702. In one example embodiment, the visual feature 702 provides a visual reference of the overall head direction (e.g., like face direction) and the deformation of the feature 702 (e.g., as in FIG. 7C) may be mapped to an eyebrow raising and/or to an eye gaze shift towards the position of the deformation (e.g., visual feature 702C may indicate eye gaze shift to the left and up).

In some embodiments, a geometric shape, such as the visual feature 702A may be mapped to input signals indicating lip sync or voice animation that produce changes in the visual features 702 in a different pattern than is used for other input signals. For example, visual features could wave or wiggle in response to detection of specific visemes. The radius of the line transforms and/or smoothness of the line could adjust (e.g., dynamically) according to the particular viseme that is detected, amplitude of the speech, pitch of the speech, and/or any other input signal derived from the user. As another example, position of the visual feature 702A on the neutral avatar could translate vertically to represent eye gaze lowering or raising. As another example, length of the visual feature 702 (or other visual features) could scale/shorten/increase to represent voice amplitude.

Figure 8B:
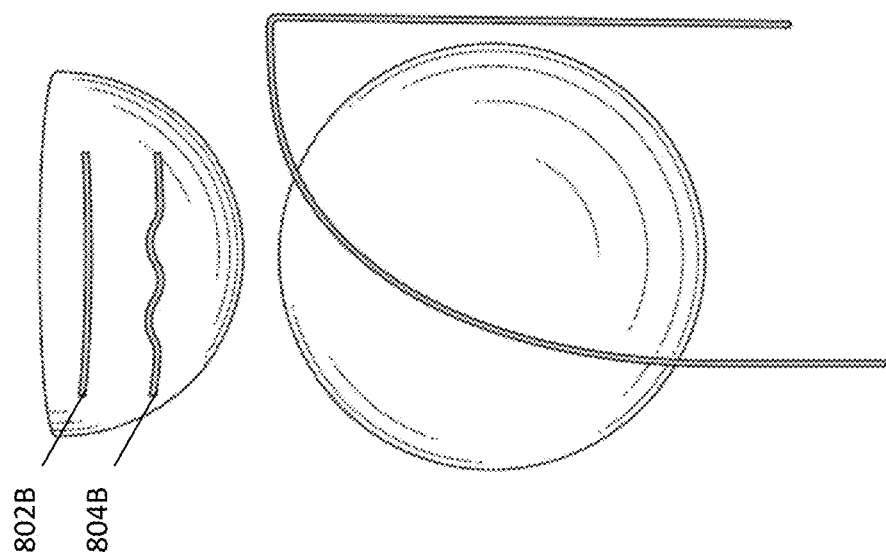
FIGS. 8A and 8B illustrate another example neutral avatar, where visual features may be modified based on one or more input signal.
Figure 8A:
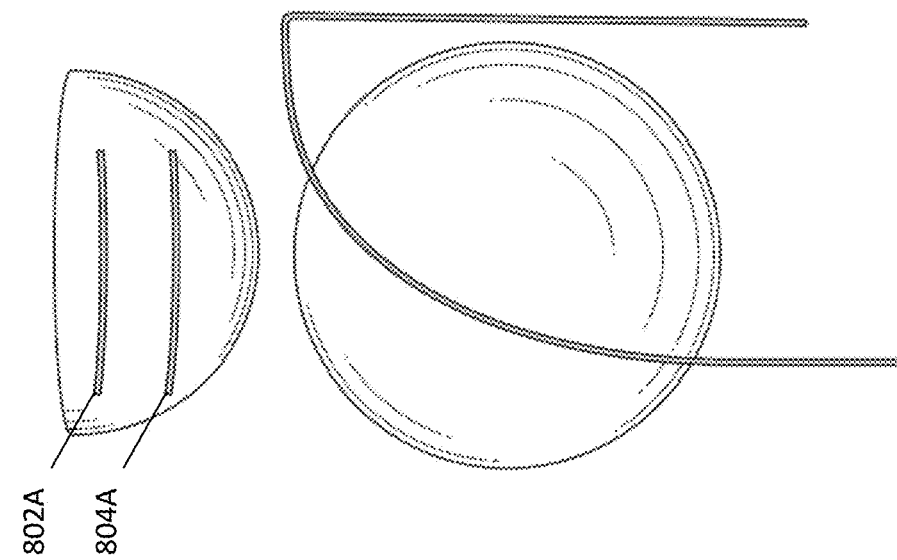

FIGS. 8A and 8B illustrate another example neutral avatar, where visual features 802 and 804 may be modified based on one or more input signals. For example, in one implementation the upper line 802A may be mapped to user gaze, such that changes in the user gaze may be shown by various changes in the upper line 802A (e.g. deformation similar to that in FIG. 7, color change, shading change, size or thickness change, etc.). In this example, the lower line 804 may be mapped to changes in voice signal, such that the lower line 804B is deformed as the user provides a voice input. Other example mappings of input signals to output signals that cause changes to a neutral avatar (e.g., the neutral avatar of FIG. 8, as well as any other neutral avatar having a corresponding visual feature):

- Length of the visual feature (e.g., one or both of the lines 802A, 804A) could shorten or lengthen with eye blink events
- A visual feature may translate left-right in association with eye gaze direction changes.
- The visual feature 804 could response to viseme changes with wiggles or deformations in shape and/or sharpness.
- Overall length and/or position could change with respect with amplitude.

The neutral avatars of FIGS. 9A, 9B, 9C, and 9D illustrate another example neutral avatar, wherein visual feature 904 includes a ring and a circle. In one implementation, a size of the circle is adjusted based on one or more input signals. For example, as shown in FIGS. 9B and 9C, size of the circle may be adjusted to indicate a change in an input signal, such as to indicate when voice input is received from the user. In this example, the larger circle of visual feature 904B may indicate active voice signal is being received, while the smaller circle of visual feature 904C may indicate no active voice signal is being received. Thus, the changes in size of the visual indicator may dynamically adjust in real-time to reflect changes in a voice signal from the user. For example, the circle portion of the visual feature 904C may pulse in unison with the user providing voice input. The same visual feature 904 may move in other manners to reflect other input signals. For example, the visual feature 904 may rotate between orientations shown in FIGS. 9A and 9D in response to changes in head pose and/or eye pose of the user. Accordingly, the visual feature 904 is reactive to multiple input signals that are provided in an easily understandable, and low complexity, neutral avatar. Other example mappings of input signals to output signals that cause changes to a neutral avatar (e.g., the neutral avatar of FIG. 9, as well as any other neutral avatar having a corresponding visual feature):

Size of circle 903 could pulse (or otherwise change) based on voice amplitude. For example, the size could indicate more than just whether the user is making sounds, but could dynamically adjust size to indicated multiple levels of voice loudness.

Circle 903 could translate left-right along the ring element to indicate eye gaze direction, which may be independent of head pose position.

Circle 903 could flatten or stretch into a squashed cylinder for blinks.

Figure 10C:
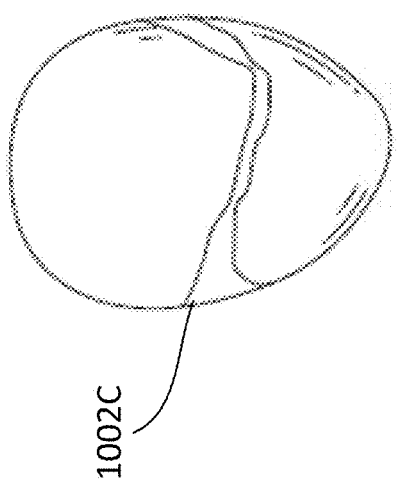
FIGS. 10A-10F illustrates six example neutral avatars, wherein adjustments in a visual feature may be tied to various of one or more input signals.
Figure 10F:
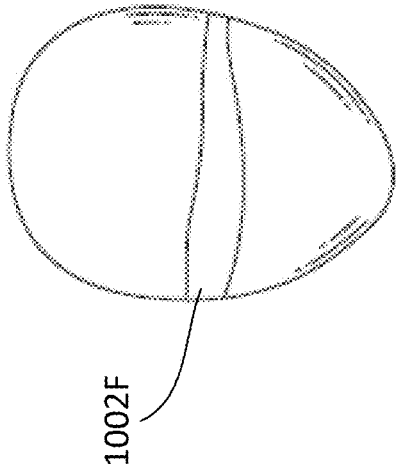
Figure 10B:
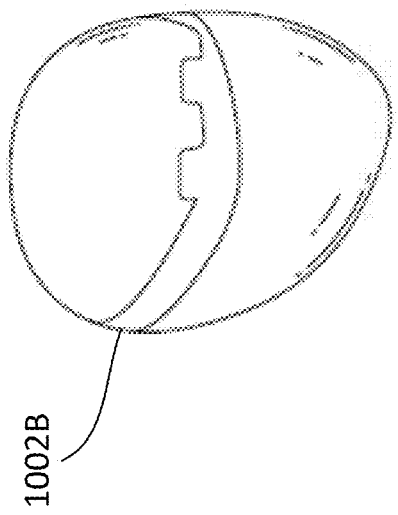
Figure 10E:
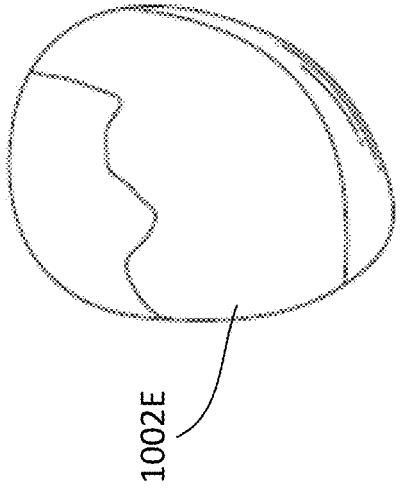
Figure 10A:
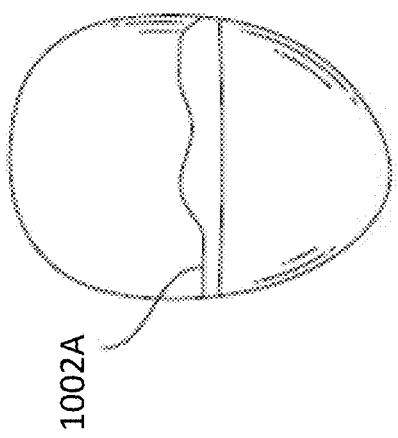
Figure 10D:
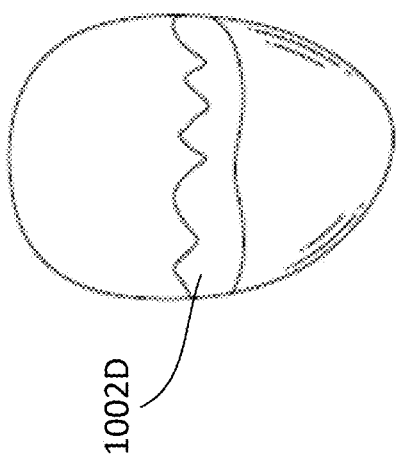

In the example of FIGS. 10A-10F, six example visualizations of a neutral avatar are illustrated, wherein adjustments in the visual feature 1002 may be tied to various of one or more input signals. In one embodiment, the position, shape, and or animation of the visual feature 1002 may be mapped to voice input. For example, visemes of the user (e.g., shapes of the user's mouth that are indicative of corresponding sounds) may be mapped to variations in the visual feature 1002. In the example of FIG. 10A, visual feature 1002A (or other substantially round shapes) may be mapped to a viseme indicative of an "Ooo" voice input, visual feature 1002B (or other shapes with substantially square edges) may be mapped to a viseme indicative of a "Thh" voice input, and visual feature 1002D (or other shapes having sharper edges) may be mapped to a viseme indicative of an "Ahh" voice input. In FIG. 10C, visual feature 1002C is indicative of gaze direction of the user shifting to look downward to the right.

For any of these animations of the visual feature 1002, the amplitude of the voice input may be indicated visually by the distance between the two lines of the visual feature 1002. For example, visual feature 1002E may represent a loud (e.g., high amplitude) voice input, while visual feature 1002F represents a quieter (e.g., low amplitude) voice input. In other embodiments, other visemes and/or voice or other input signals may be mapped to similar adjustments in visual feature 1002 (or other visual features of neutral avatars).

FIGS. 11A-11H illustrate another example neutral avatar with various forms of a visual feature 1102 that may be dynamically updated based on one or more input signals. In some embodiments, the visual feature 1102 (e.g., which may appear like a visor or floating sunglasses in some implementations) may move from side to side (e.g., as shown in FIGS. 11B and 11C) in response to changes in eye pose and/or head pose. FIGS. 11F and 11G illustrate the visual feature 1102F changing to a smaller size as visual feature 1102G, which may reflect changes in the user's attentiveness or may be animated to correspond with voice input from the user. For example, the larger visual feature 1102F may be shown when an input signal indicating voice input is being received, while the smaller visual feature 1102G is shown when no voice input is being received (e.g., between spoken words or other pauses in speech). The visual feature 1102H may indicate changes in two input signals, one mapped to the left of the visual feature 1102H and one to the right of the visual feature 1102H. Thus, size, shape, color, shading, etc. of portions of the visual feature 1102H (e.g., left and right sides of the visual feature 1102H) may independently indicate user behaviors or social cues. In some embodiments, a texture effect may be indicated with reference to the visual feature 1102 that is indicative of voice activity. For example, a backlighting effect such as is shown in FIG. 11I may pulse, move, etc. in accordance with voice input. In one embodiment, the pulse shape (and/or other characteristics) may change in a similar manner as discussed above with reference to FIGS. 10A-10F (e.g., to reflect a particular viseme and/or amplitude). In this example, other characteristics of the visual feature 1102I may remain mapped to other signal inputs, such as those discussed above. FIG. 11E illustrates another example visual feature on top of the visual feature 1102E that may be mapped to various voice input and/or other input signals.

FIGS. 12A and 12B illustrate another example neutral avatar, wherein a morph, movement, and/or other visual change to portions of the neutral avatar may be mapped to one or more input signals. In this example, dynamically scaling of the sphere 1202 may indicate changed in voice amplitude, where larger sphere size (e.g., 1202A) may be associated with higher amplitude of voice input, while smaller sphere size (e.g., 1202B) may be associated with lower amplitude of voice input. In one example, color, texture, or other attribute of the sphere 1202 could mapped to other voice attributes, such as specific sounds or visemes. In one embodiment, the horizontal element 1204 may stretch, scale, or otherwise morph, to indicate gaze or attention direction of the user.

In any of the examples above, the links between input signals and output signals may be combined, separated, and/or mapped to changes in other visual features. As noted above, in some embodiments shading of visual features may indicate changes in one or more input signals. Additionally, shading of other portions of the neutral, such as the portion of the avatar face or body, may indicate changes in an input signal.

EXAMPLE IMPLEMENTATIONS

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example One: A computing system comprising: a hardware computer processor; a non-transitory computer readable medium having software instructions stored thereon, the software instructions executable by the hardware computer processor to cause the computing system to perform operations comprising: providing co-presence environment data usable by a plurality of users to interact in an augmented reality environment; for each of a plurality of users: determine one or more visual distinctions of a neutral avatar for the user, wherein the visual distinctions are different from visual distinctions of neutral avatars of others of the plurality of users; and updating the co-presence environment data to include the determined visual distinctions of neutral avatars.

Example Two: The computing system of Example One, wherein the visual distinction comprises a color, texture, or shape of the neutral avatar.

Example Three: The computing system of Example One, wherein the operations further comprise: storing determined visual distinctions for particular users, wherein said determining the neutral avatar for the user comprises selecting a stored visual distinction associated with the user.

Example Four: The computing system of Example One, wherein determining visual distinctions of neutral avatars for users is performed automatically, without regard to personal characteristics of the user.

Example Five: A computing system comprising: a hardware computer processor;

a non-transitory computer readable medium having software instructions stored thereon, the software instructions executable by the hardware computer processor to cause the computing system to perform operations comprising: determine a neutral avatar associated with a user in an augmented reality environment, wherein the neutral avatar includes no indications of gender, ethnicity, and identity of the user; and wherein the neutral avatar is configured to represent input cues from the user with changes to visual elements of the neutral avatar that are non-literal indications of the corresponding input cue; and provide real-time rendering updates to the neutral avatar that are viewable by each of a plurality of users in a shared augmented reality environment.

Example Six: The computing system of Example Five, wherein a first visual element is associated with two or more input cues.

Example Seven: The computing system of Example Six, wherein the input cues include one or more of gaze direction, voice, head pose and hand pose.

Example Eight: The computing system of Example Seven, wherein the input cues include one or more of shared attention, shared gaze, and mutual gestures.

Example Nine: The computing system of Example Five, further comprising:

a signal mapping component storing a mapping between input cues and corresponding output signals, wherein the real-time rendering updates are determined based on the output signals.

Example Ten: The computing system of Example Five, wherein the neutral avatar includes a visual element that is deformable in response to a voice input cue.

Example Eleven: The computing system of Example Ten, wherein the visual element is deformable in another manner in response to an input cue indicating a particular gaze activity.

Example Twelve: The computing system of Example Five, wherein the neutral avatar includes a visual element that changes in size in response to a voice input cue.

Example Thirteen: The computing system of Example Five, wherein the neutral avatar includes a visual element that changes shading of a portion of the neutral avatar in response to a voice input cue.

Example Fourteen: The computing system of Example Thirteen, wherein the portion of the neutral avatar is not associated with a mouth area of the neutral avatar.

Example Fifteen: The computing system of Example Five, wherein the neutral avatar comprises one or more geometric shapes.

As noted above, implementations of the described examples provided above may include hardware, a method or process, and/or computer software on a computer-accessible medium.

OTHER CONSIDERATIONS

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time. As another example, calculating the weight map, rotation, and translation parameters for a skinning system by solving a constrained optimization problem for these parameters is highly computationally intensive (see, e.g., the example processes 1400 described with reference to FIG. 14).

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A computing system comprising:
   a hardware computer processor; and
   a non-transitory computer readable medium having software instructions stored thereon, the software instructions executable by the hardware computer processor to cause the computing system to perform operations comprising:
   providing co-presence environment data usable by a plurality of users to interact in an augmented reality environment;

for each of a plurality of users:
   determining one or more visual distinctions of a neutral avatar for the user, wherein the visual distinctions are different from visual distinctions of neutral avatars of others of the plurality of users;
   detecting an eye feature of the user based on one or more of: eye rotation, eye movement, or eye gaze direction;
   determining, based at least on the detected eye feature, a visual change of the neutral avatar including one or more of:
      color of the neutral avatar;
      shading of the neutral avatar;
      shape of the neutral avatar;
      background of the neutral avatar; and
   updating the co-presence environment data to include the determined visual change of the neutral avatar.

2. The computing system of claim 1, wherein the visual distinction is further determined based on voice input from the user.

3. The computing system of claim 2, wherein the visual distinction comprises a wiggle of a geometric feature of the neutral avatar to indicate voice activity and a movement of the geometric feature to indicate eye gaze direction.

4. The computing system of claim 1, wherein the operations further comprise:
   storing determined visual distinctions for particular users, wherein said determining the neutral avatar for the user comprises selecting a stored visual distinction associated with the user.

5. The computing system of claim 1, wherein determining visual distinctions of neutral avatars for users is performed automatically, without regard to personal characteristics of the user.

6. The computing system of claim 1, wherein the visual distinction is further determined based on an input cue including one or more of voice, head pose or hand pose.

7. The computing system of claim 1, wherein the operations further comprise:
   providing a visual indication of one or more of shared attention, shared gaze, or mutual gestures associated with two or more users.

\* \* \* \* \*